(12) United States Patent
Beffa, Jr.

(10) Patent No.: US 9,635,830 B2
(45) Date of Patent: May 2, 2017

(54) PORTABLE MILKING MACHINE

(71) Applicant: Daniel Leo Beffa, Jr., Lee, FL (US)

(72) Inventor: Daniel Leo Beffa, Jr., Lee, FL (US)

( * ) Notice: Subject to any disclaimer, the term of this patent is extended or adjusted under 35 U.S.C. 154(b) by 0 days.

(21) Appl. No.: 15/051,111

(22) Filed: Feb. 23, 2016

(65) Prior Publication Data

US 2016/0353702 A1 Dec. 8, 2016

Related U.S. Application Data

(60) Provisional application No. 62/170,371, filed on Jun. 3, 2015.

(51) Int. Cl.
*A01J 5/04* (2006.01)

(52) U.S. Cl.
CPC .................... *A01J 5/047* (2013.01)

(58) Field of Classification Search
CPC  A61M 1/06; A61M 1/0066; A01J 5/04; A01J 5/047
USPC ........................ 119/14.43, 14.47, 14.2, 14.24
See application file for complete search history.

(56) References Cited

U.S. PATENT DOCUMENTS

| | | | | |
|---|---|---|---|---|
| 777,102 | A * | 12/1904 | Howell | A01J 5/08 119/14.43 |
| 2,612,136 | A * | 9/1952 | Davis | A01J 5/08 119/14.43 |
| 2,696,193 | A * | 12/1954 | Domingo | A01J 5/04 119/14.01 |
| 2,868,167 | A * | 1/1959 | Clark | A01J 5/04 119/14.05 |
| 3,653,359 | A * | 4/1972 | Tolle | A01J 3/00 119/14.02 |
| 3,782,385 | A * | 1/1974 | Loyd | A61M 1/06 604/74 |
| 3,949,705 | A * | 4/1976 | Portalis | A01J 5/047 119/14.43 |
| 4,249,481 | A * | 2/1981 | Adams | A01J 5/08 119/14.02 |
| 4,680,028 | A * | 7/1987 | Stuart | A61M 1/06 604/316 |
| 4,735,172 | A * | 4/1988 | Wahlstrom | A01J 5/044 119/14.1 |
| 5,843,029 | A * | 12/1998 | Bachman | A61M 1/06 604/115 |
| 6,093,168 | A * | 7/2000 | Mendenhall | A47L 7/00 604/74 |
| 6,488,635 | B1 * | 12/2002 | Mottram | A61B 5/083 119/14.01 |
| 6,500,143 | B2 * | 12/2002 | Suh | A61M 1/0066 119/14.01 |

(Continued)

*Primary Examiner* — Yvonne Abbott-Lewis
(74) *Attorney, Agent, or Firm* — Dunlap Bennett & Ludwig PLLC

(57) ABSTRACT

A portable milking machine is provided. The portable milking machine includes a container, such as a jar. The container includes a rim forming an opening leading into an inside of the container. A cover releasably secures to the rim forming an air tight seal with the container. A first nozzle and a second nozzle forms a fluid connection between the inside of the container and the outside of the container. A vacuum pump powered by a power source is fluidly connected with the first nozzle. A first teat cup sized to receive a teat of an animal within and is fluidly connected to the second nozzle.

6 Claims, 4 Drawing Sheets

(56) References Cited

U.S. PATENT DOCUMENTS

| | | | |
|---|---|---|---|
| 8,945,046 B2* | 2/2015 | Brittner | A61M 1/06 604/73 |
| 9,033,953 B2* | 5/2015 | Felber | A61M 1/06 604/514 |
| 9,278,167 B2* | 3/2016 | Aalders | A61M 1/0031 |

* cited by examiner

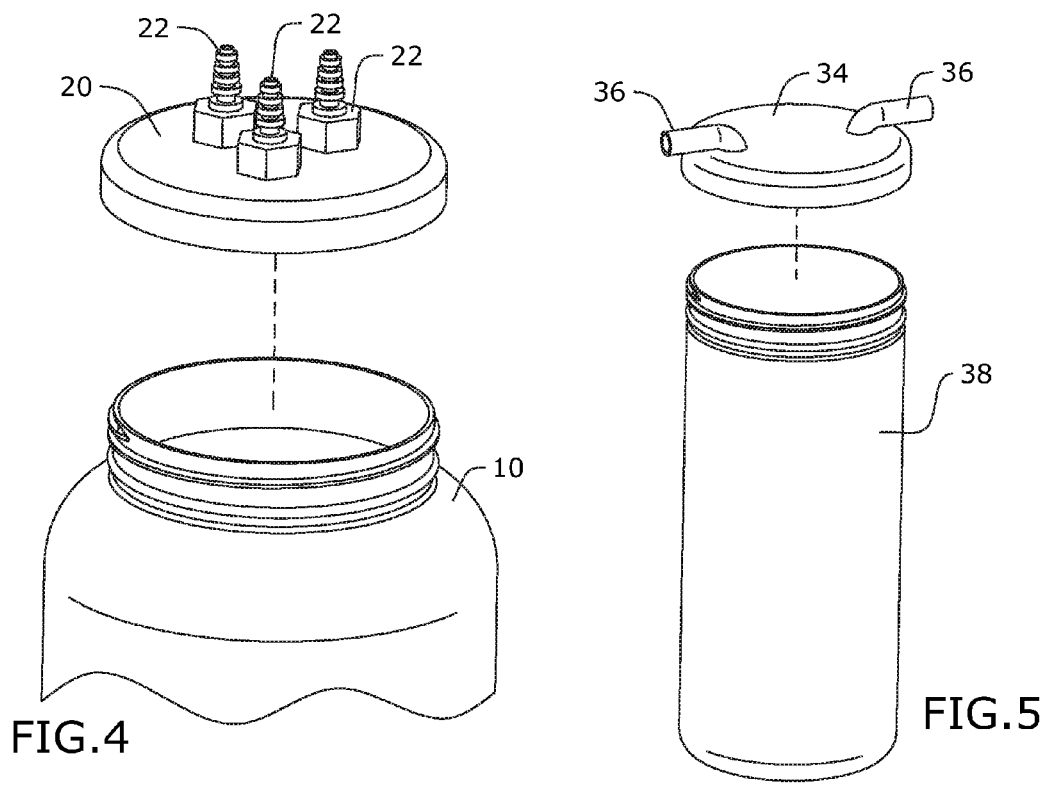
FIG.4
FIG.5
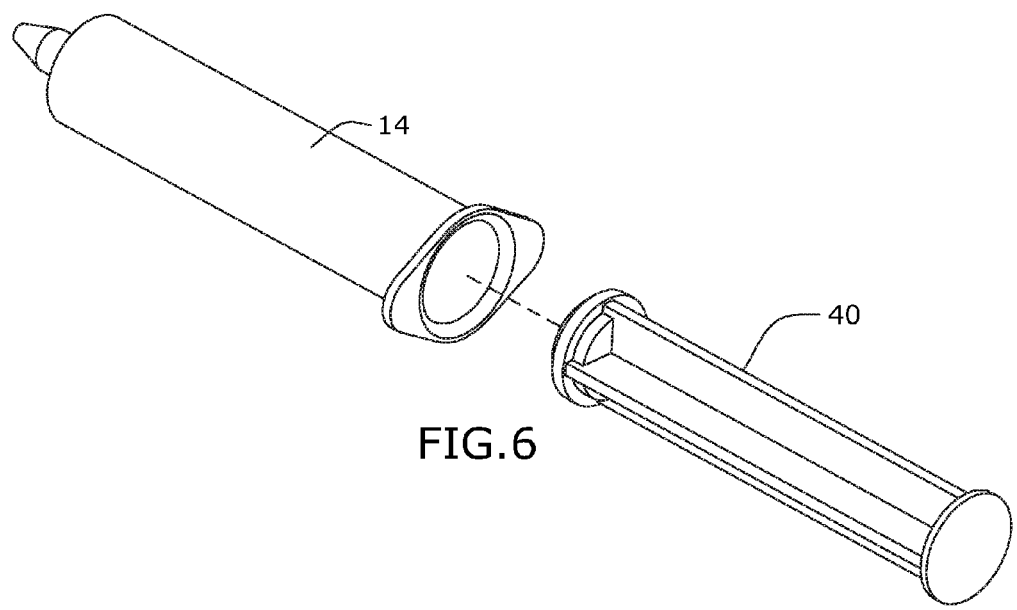
FIG.6

PORTABLE MILKING MACHINE

CROSS-REFERENCE TO RELATED APPLICATION

This application claims the benefit of priority of U.S. provisional application No. 62/170,371, filed Jun. 3, 2015, the contents of which are herein incorporated by reference.

BACKGROUND OF THE INVENTION

The present invention relates to milking machines and, more particularly, to a portable milking machine.

Milking machines are used to harvest milk from cows, goats, sheep and many other breeds when manual milking becomes inefficient or labor-intensive. Currently, milking machines are very expensive and not portable. Further, current milking machines do not include a sealed system, which exposes the milking machine to contamination.

As can be seen, there is a need for an improved portable milking machine.

SUMMARY OF THE INVENTION

In one aspect of the present invention, a portable milking machine comprises: a container comprising a rim forming an opening leading into an inside of the container; a cover releasably secured to the rim forming an air tight seal with the container; a first and second nozzle forming a fluid connection between the inside of the container and an outside of the container; a third nozzle forming a fluid connection between the inside of the container and the outside of the container; a vacuum pump fluidly connected with the third nozzle; a power supply operable to power to the vacuum pump; and a first teat(s) cup sized to receive a teat of an animal within, fluidly connected to the second nozzle.

In another aspect of the present invention, a portable milking machine comprises: a container comprising a rim forming an opening leading into an inside of the container; a cover releasably secured to the rim forming an air tight seal with the container; a first and second nozzle secured to the cover and forming a fluid connection between the inside of the container and an outside of the container; a third nozzle secured to the cover and forming a fluid connection between the inside of the container and the outside of the container; a vacuum pump fluidly connected with the third nozzle; a power supply operable to power to the vacuum pump; and a first and second teat cup sized to receive a teat(s) of an animal within, fluidly connected to the second nozzle.

These and other features, aspects and advantages of the present invention will become better understood with reference to the following drawings, description and claims.

BRIEF DESCRIPTION OF THE DRAWINGS

FIG. 4 is an exploded detail view of an embodiment of the present invention;

FIG. 5 is an exploded detail view of an alternate embodiment of the present invention;

FIG. 6 is an exploded view of an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
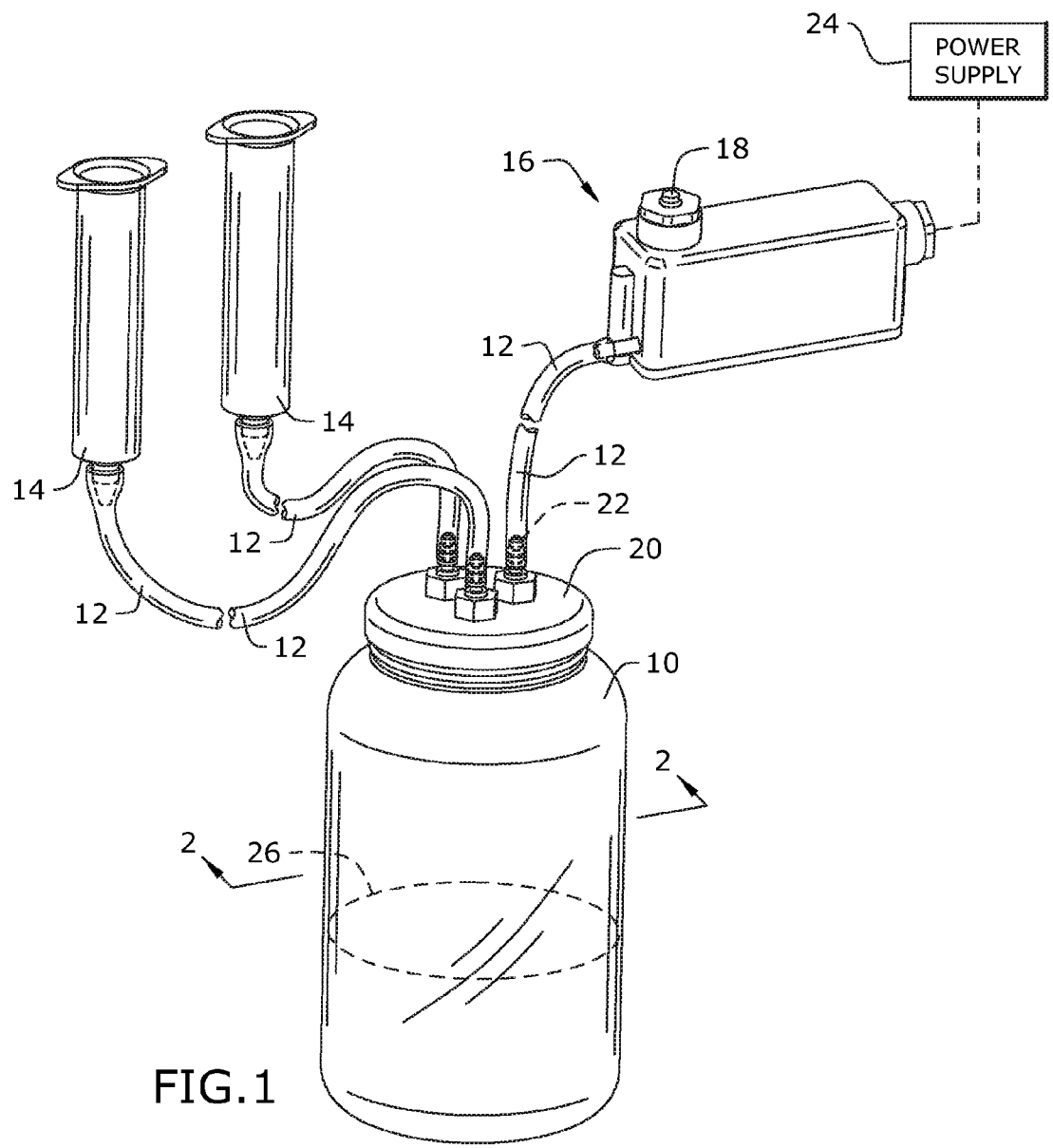
FIG. 1 is a perspective view of an embodiment of the present invention.
Figures 2, 3:
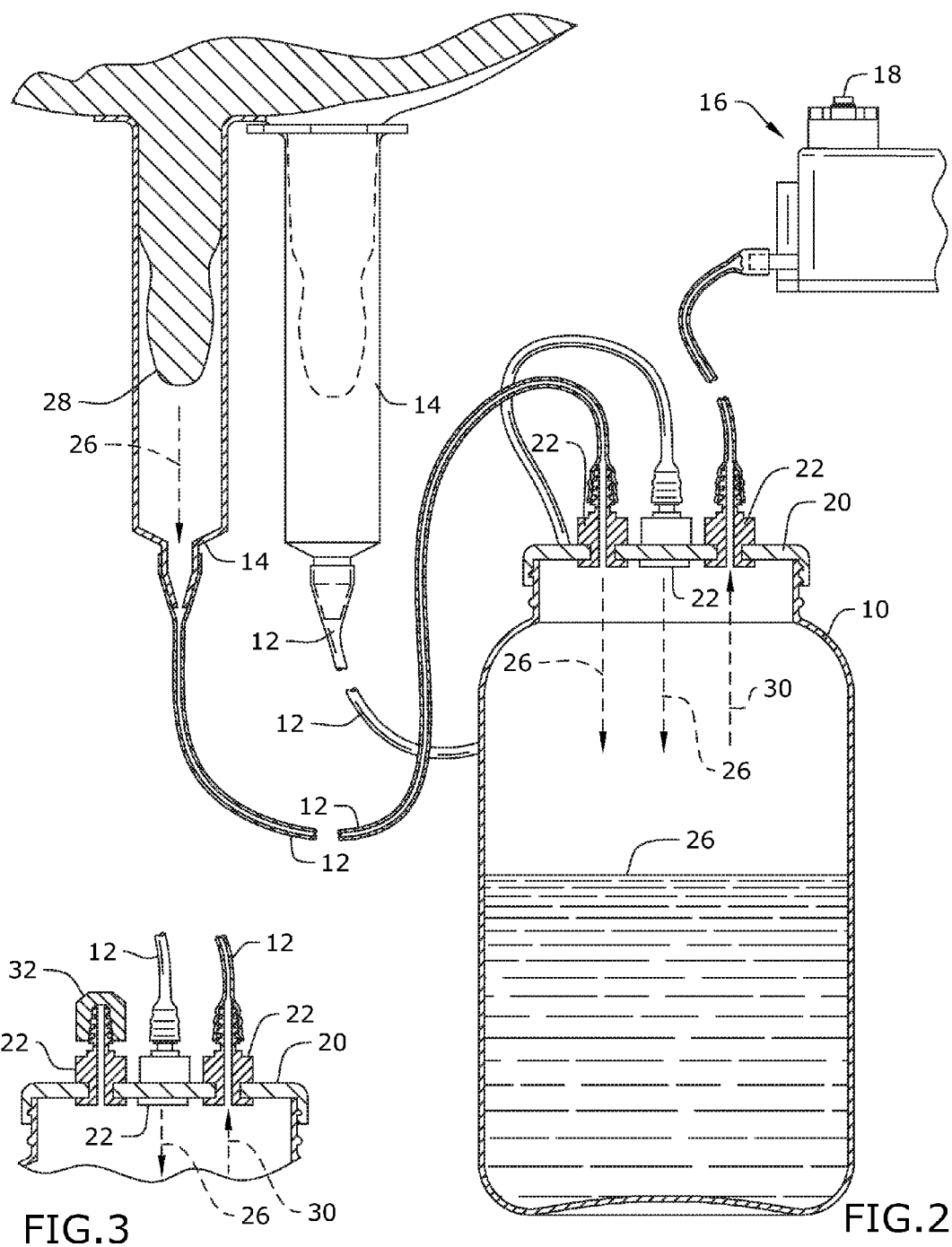
FIG. 2 is a section detail view of an embodiment of the present invention shown in use along line 2-2 in FIG. 1.
FIG. 3 is a section detail view of an alternate embodiment of the present invention.

Referring to FIGS. 1 through 6, the present invention includes a portable milking machine. The portable milking machine includes a container 10, such as a jar. The container 10 includes a rim forming an opening leading into an inside of the container 10. A cover 20 releasably secures to the rim forming an air tight seal with the container 10. A first nozzle 22 and a second nozzle 22 each form a fluid connection between the inside of the container 10 and the outside of the container 10. A vacuum pump 16 powered by a power source 24 is fluidly connected with the first nozzle 22. A first teat cup 14 sized to receive a teat 28 of an animal within and is fluidly connected to the second nozzle 22.

As mentioned above, the teat cup 14 is sized to snuggly fit a teat 14 of an animal within. The teat cup 14 may be in the shape of an elongated cylinder, and may be made of a plastic or glass. The teat cup 14 may include an opening forming an entrance for the teat 14. The teat cup 12 may also include an exit such as a tapered mouth to fluidly connect with the nozzles 22. To clean the teat cups 14, a teat cup plunger 40 may be used.

In certain embodiments, the first nozzle 22 and the second nozzle 22 are secured to the cover 20. Therefore, the cover 20 may be easily removed from the container 10 with the nozzles 22 attached, permitting access to the pumped milk 26. In certain embodiments, the present invention further includes a third nozzle 22 and may include four or more nozzles 22. The third nozzle 22 may also form a fluid connection between the inside of the container 10 and the outside of the container 10. In such embodiments, the present invention may include a second teat cup 14 sized to receive the teat 28 of the animal within and fluidly connected with the third nozzle 22. Therefore, multiple teats 28 may be pumped at once using the present invention.

As illustrated in FIGS. 1 through 4, the nozzles 22 may be vertically oriented relative to the cover 20. As illustrated in FIG. 5, alternative nozzles 36 may include an inlet that is substantially perpendicular to an alternative cover 34. The alternative cover 34 releasably secures to an alternative jar 38 forming an airtight seal. The inlets of the alternative nozzles may extend radially away from a center of the alternative cover 34. The design of the alternative nozzles 36 allow for a more compact cover 34.

The present invention may further include a cap 32 or a plurality of caps 32. The caps 32 are each sized to fit over a nozzle 22 and form an air tight seal. Therefore, a cap 32 may be placed on one nozzle 22 if only one teat cup 14 is in use. Further, if the present invention is not in use and disassembled, the caps 32 may be secured over the nozzles 22 to prevent contamination. The caps 32 may be made of a flexible rubber like material.

In certain embodiments, the present invention may utilize tubing 12 to establish the fluid connection. In such embodiments, the present invention includes a flexible tubing 12 having a first end forming a first opening and a second end forming a second opening. A first end of a first flexible tubing 12 may be secured over a tapered mouth of the first nozzle 22. The second end of the first flexible tubing 12 may be secured over an intake of the pump 16, thereby fluidly connecting the first nozzle 22 to the pump 16. A first end of a second flexible tubing 12 may be secured over a tapered mouth of the second nozzle 22. The second end of the second flexible tubing 12 may be secured over a tapered mouth of the teat cup 14, thereby fluidly connecting the second nozzle 22 to the teat cup 14.

Figure 7:
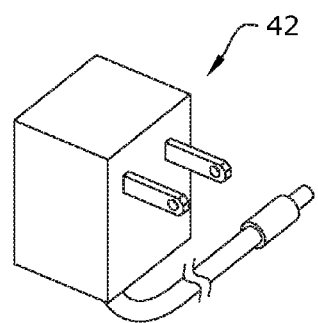
FIG. 7 is a perspective view of an embodiment of the power supply of the present invention.
Figure 8:
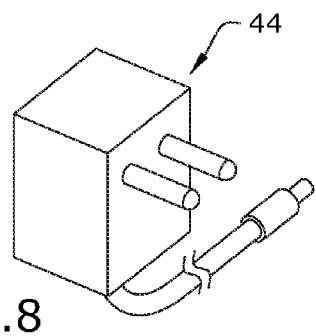
FIG. 8 is a perspective view of an embodiment of the power supply of the present invention.
Figure 9:
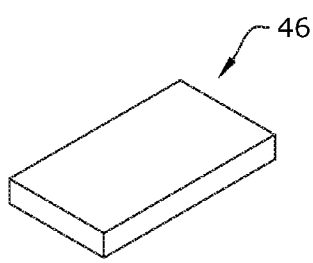
FIG. 9 is a perspective view of an embodiment of the power supply of the present invention.
Figure 10:
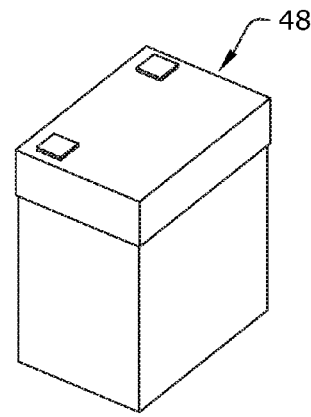
FIG. 10 is a perspective view of an embodiment of the power supply of the present invention.
Figure 11:
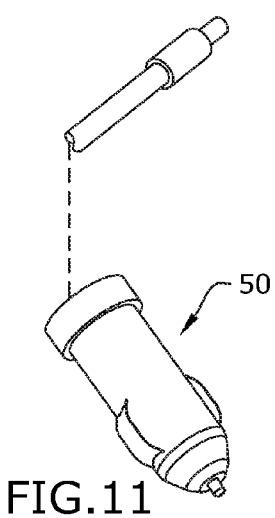
FIG. 11 is a perspective view of an embodiment of the power supply of the present invention.
Figure 12:
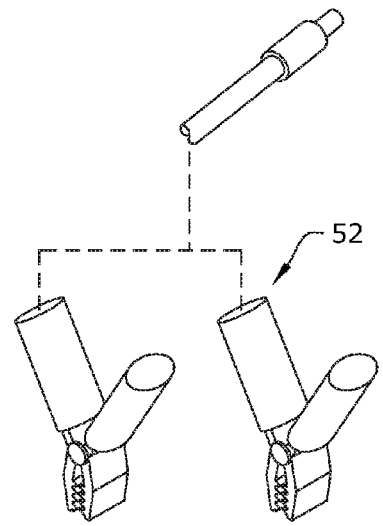
FIG. 12 is a perspective view of an embodiment of the power supply of the present invention.

The pump 16 of the present invention may include an on and off switch 18 and a power supply 24. As illustrated in FIGS. 7 through 12, the present invention may utilize different power supplies. For example, a power cord may be connected to the pump 16. In such embodiments, the power cord may include an American plug 42, a European plug 44, a car cigarette light plug 50 and the like. Therefore, the pump 16 may be plugged into various outlets, making the present invention portable. Further, the power supply may include a battery 46, a battery pack 48, or clamps 52 connectable to a car battery, making the present invention portable.

A method of using the present invention may include the following. Place the cover 20 over the rim of the container 10, forming an air tight seal. Fluidly connect the pump 16 with one of the nozzles 22 using a first flexible tubing 12. Fluidly connect one of the teat cups 14 with another of the nozzles 22 using a second flexible tubing 12. If the user is pumping from more than one teat 28, fluidly connect another of the teat cups 14 with another of the nozzles 22 using a third flexible tubing 12. Connect the pump 16 to a power supply 24. Turn the switch to on 18 and begin pumping. The pump 16 vacuums air 30 out of the container, pulling on the teats 28 and milking the animal. The container 10 is then filled with milk 26. The present invention may then be disassembled for later use.

It should be understood, of course, that the foregoing relates to exemplary embodiments of the invention and that modifications may be made without departing from the spirit and scope of the invention as set forth in the following claims.

What is claimed is:

1. A portable milking machine comprising:
   a container comprising a rim forming an opening leading into an inside of the container;
   a cover releasably secured to the rim forming an air tight seal with the container;
   a first nozzle forming a fluid connection between the inside of the container and an outside of the container;
   a second nozzle forming a fluid connection between the inside of the container and the outside of the container;
   a third nozzle forming a fluid connection between the inside of the container and the outside of the container;
   a vacuum pump fluidly connected with the first nozzle;
   a power supply operable to power to the vacuum pump;
   a first teat cup sized to receive a teat of an animal within, fluidly connected to the second nozzle;
   a second teat cup sized to receive a teat of an animal within, fluidly connected with the third nozzle; and
   a cap sized to secure over one of the first nozzle, the second nozzle, and the third nozzle, forming an air tight seal.

2. The portable milking machine of claim 1, wherein the first nozzle and the second nozzle are secured to the cover.

3. The portable milking machine of claim 1, wherein a first flexible tube fluidly connects the vacuum pump to the first nozzle and a second flexible tube fluidly connects the first teat cup to the second nozzle.

4. The portable milking machine of claim 1, wherein the power source comprises at least one of a plug connected to an outlet, a battery, a battery pack, a plug connect to a car cigarette lighter receptacle, and a pair of clamps connected to a battery.

5. A portable milking machine comprising:
   a container comprising a rim forming an opening leading into an inside of the container;
   a cover releasably secured to the rim forming an air tight seal with the container;
   a first nozzle secured to the cover and forming a fluid connection between the inside of the container and an outside of the container;
   a second nozzle secured to the cover and forming a fluid connection between the inside of the container and the outside of the container;
   a third nozzle secured to the cover and forming a fluid connection between the inside of the container and the outside of the container;
   a vacuum pump fluidly connected with the first nozzle;
   a power supply operable to power to the vacuum pump;
   a first teat cup sized to receive a teat of an animal within, fluidly connected to the second nozzle;
   a second teat cup sized to receive a teat of an animal within, fluidly connected with the third nozzle; and
   a cap sized to secure over one of the first nozzle, the second nozzle, and the third nozzle, forming an air tight seal.

6. The portable milking machine of claim 5, wherein a first flexible tube fluidly connects the vacuum pump to the first nozzle and a second flexible tube fluidly connects the first teat cup to the second nozzle.

\* \* \* \* \*